United States Patent
Diaz et al.

(10) Patent No.: US 6,790,920 B2
(45) Date of Patent: Sep. 14, 2004

(54) PROCESS FOR REMOVAL OF SILICON COMPOUNDS FROM SOLVENTS BY SELECTIVE ABSORPTION

(75) Inventors: Zaida Diaz, Houston, TX (US); Grant W. Haddix, Katy, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 153 days.

(21) Appl. No.: 10/242,209

(22) Filed: Sep. 12, 2002

(65) Prior Publication Data

US 2004/0054091 A1 Mar. 18, 2004

(51) Int. Cl.[7] .............................. C08F 4/46; B01J 20/34
(52) U.S. Cl. ........................ 526/173; 526/335; 502/31; 502/85; 502/514
(58) Field of Search ................................. 526/173, 335; 502/31, 85, 514

(56) References Cited

U.S. PATENT DOCUMENTS

| | | |
|---|---|---|
| 3,698,157 A | * 10/1972 | Allen et al. ..................... 95/84 |
| 5,220,100 A | 6/1993 | Massie et al. |
| 5,536,391 A | 7/1996 | Howley et al. |
| 5,620,590 A | 4/1997 | Absil et al. |

* cited by examiner

*Primary Examiner*—Robert D. Harlan

(57) ABSTRACT

Removing silicon species from hydrocarbon solvents such as cyclohexane by flowing the hydrocarbon solvent through a selective adsorbent selected from the group consisting of aluminas, silicon-aluminas, ion exchange resins, zeolite Y, and combinations thereof.

16 Claims, No Drawings

PROCESS FOR REMOVAL OF SILICON COMPOUNDS FROM SOLVENTS BY SELECTIVE ABSORPTION

BACKGROUND OF THE INVENTION

1. Field of the Invention

The present invention relates to a process for removing silicon compounds from hydrocarbon solvents. More particularly, the invention relates to a process for removing residual silicon species from polymerization solvents.

2. Background of the Related Art

Solvents containing silicon compounds are by-products of polymerization processes for making telechelic polymers and also by-products of other manufacturing processes. Telechelic polymers include diols, triols and star polyols, which have found wide utility in many applications. Telechelic polymers have been employed as rocket fuel binders, in coatings and sealants and in adhesives, and can be co-polymerized with appropriate materials to form polyesters, polycarbonates, and polyamides.

In a typical polymerization process of telechelic polymers, a silicon compound is added to a diene monomer in a hydrocarbon solvent to initiate polymerization of the diene compound. A structure modifier may also be present. After polymerization is complete, a capping agent such as ethylene oxide may be added to introduce a terminal functional group. The polymer is optionally hydrogenated to reduce unsaturation. The resulting silicon compound such as a silyl ether is then hydrolyzed in the presence of an acid, and optionally an alcohol, to produce the desired telechelic polymer. During hydrolysis, residual silicon species are formed as by-products at lower concentrations either as impurities in the initiator, die-out products of the initiator, or side products of the hydrolysis. These residual silicon species can interfere with polymerization and, therefore, should be removed from the solvent before recycling the solvent for polymerization.

There remains a need to efficiently separate residual silicon species from hydrocarbon solvents. Using distillation to separate organic solvents from residual silicon species is difficult since the boiling points of the residual silicon species and solvents are only a few degrees apart. Direct distillation also incurs the risk of entraining other contaminants, like nitrogen compounds or sulfurous compounds, into the distillate.

SUMMARY OF THE INVENTION

The present invention generally provides a process for removing residual silicon species from hydrocarbon solvents by adsorbing the silicon species on a selective adsorbent. The process is useful for recovering solvent after producing telechelic polymers by polymerizing a monomer in a hydrocarbon solvent with a silicon compound. After the hydrocarbon solvent is separated from the polymer cement, the hydrocarbon solvent is purified in an adsorption bed containing the selective adsorbent. The hydrocarbon solvent is recovered and recycled to the polymerization process.

DETAILED DESCRIPTION OF THE PREFERRED EMBODIMENT

Telechelic polymers can be made using a lithium initiator that contains a hydroxyl group which has been blocked as the silyl ether. Details of the polymerization procedure can be found in U.S. Pat. No. 5,376,745, which is herein incorporated by reference. The monomer(s) to be anionically polymerized can be selected from any suitable monomer capable of anionic polymerization, including conjugated alkadienes, alkenyl-substituted aromatic hydrocarbons, and mixtures thereof. The conjugated alkadienes may be polymerized alone, or in admixture with each other or with alkenyl-substituted aromatic hydrocarbons to form random copolymers, or by charging the conjugated alkadienes to the reaction mixture sequentially, either with each other or with alkenyl-substituted aromatic hydrocarbons, to form block copolymers.

Examples of conjugated alkadiene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene. Examples of alkenyl-substituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-ethylvinylnaphthalene, 2-alpha-methylvinylnaphathalene, 1,2-diphenyl-4-methyl-1-hexene and mixtures of these, as well as alkyl, cycloalkyl, aryl, alkaryl, and aralkyl derivatives thereof in which the total number of carbon atoms in the combined hydrocarbon constituents is generally not greater than 18. Examples of these latter compounds include; 3-methylstyrene, 3,5-diethylstyrene, 2-ethyl-4-benzylstyrene, 4-phenylstyrene, 4-p-tolylstyrene, 2,4-divinyltoluene, and 4,5-dimethyl-1-vinylnaphthalene. Reference is made to U.S. Pat. No. 3,377,404 for disclosures of additional alkenyl substituted aromatic compounds. As used herein, the reference to mixtures of monomers refers to mixtures of conjugated alkadienes, mixtures of alkenyl-substituted aromatic hydrocarbons, and mixtures of one or more conjugated alkadienes with one or more alkenyl-substituted aromatic hydrocarbons.

The polymerization solvent is preferably an inert, non-polar hydrocarbon hydrocarbon solvent. Inert hydrocarbon solvents useful in practicing this invention comprise alkanes and cycloalkanes containing five to ten carbon atoms such as pentane, hexane, cyclohexane, methylcyclohexane, heptane, methylcycloheptane, octane, decane and so forth, and aromatic solvents containing six to ten carbon atoms such as benzene, toluene, ethylbenzene, p-xylene, m-xylene, o-xylene, n-propylbenzene, isopropylbenzene, n-butylbenzene, and the like.

When the conjugated alkadiene is 1,3-butadiene and when the resulting polymer will be hydrogenated, the anionic polymerization of butadiene in a hydrocarbon solvent like cyclohexane is typically controlled with structure modifiers, such as diethylether, glyme (1,2-diethoxyethane), or O-dimethoxybenzene to obtain the desired vinyl content. O-dimethoxybenzene is the preferred structure modifier. As described in U.S. Pat. No. Re 27,145 which is incorporated by reference herein, the level of 1,2-addition of butadiene in the polymer or copolymer can greatly affect viscosity and elastomeric properties after hydrogenation.

Anionic polymerization may be terminated by addition of a proton donor such as water to remove the lithium as lithium hydroxide (LiOH) or an alcohol (ROH) to remove the lithium as a lithium alkoxide (LiOR). Polymers terminated in this way will be mono-hydroxy functional (mono-ols) after removal of the silyl protecting group. Polymers having an additional terminal functional groups are prepared by terminating with hydroxyl, carboxyl, phenol, epoxy, or amine groups by reaction with ethylene oxide, oxetane, 2,2-dimethyloxetane, carbon dioxide, a protected hydroxystyrene monomer, ethylene oxide plus epichlorohydrin, or the amine compounds listed in U.S. Pat. No. 4,791,174, respectively, which is incorporated by reference herein.

If desired, the polymer can be hydrogenated. Hydrogenation may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755, which is incorporated by reference. Examples of methods to hydrogenate the polymers of this invention are described in U.S. Pat. Nos. 4,970,254, 5,166,277, 5,393,843 and 5,496,898. The hydrogenation of the functionalized polymer is conducted in situ, or in a suitable solvent, such as hexane, cyclohexane, or heptane. This solution is contacted with hydrogen gas in the presence of a catalyst, such as a nickel catalyst. A particularly preferred catalyst is nickel aluminum such as a mixture of nickel 2-ethylhexanoate and triethylaluminum. The hydrogenation is typically performed at temperatures from 25° C. to 150° C., with a typical hydrogen pressure of 15 psig to 1000 psig. The hydrogenation reaction can be conducted until at least 90% of the aliphatic unsaturation has been saturated. The hydrogenated functional polymer can then be recovered by conventional procedures, such as removal of the catalyst with aqueous acid wash, followed by solvent removal or precipitation of the polymer. Because the polymers may have different diene blocks, these diene blocks may be selectively hydrogenated as described in U.S. Pat. Nos. 5,229,464 and Re 27,145, which are also incorporated by reference herein.

After polymerization and, optionally, hydrogenation and washing of the polymer, the hydroxyl functionality on the blocked end of the polymer is obtained by cleaving the silyl ether by hydrolysis. This step is often referred to as deprotection. A variety of processes for removal of the silyl protecting group are known; for a review, see T. W. Greene, "Protective Groups in Organic Synthesis", J. Wiley and Sons, New York, 1981. An acceptable acid catalyst for performing the hydrolysis of the polyether is methane sulfonic acid (MSA), delivered to the polymer cement in a solution containing amyl alcohol and water.

Residual silicon species are formed by the deprotection reaction. The residual silicon species contain trimethyl silane (TMS) functionality, and their form depends on the deprotecting agents used. During acid catalyzed hydrolysis, hexamethyldisiloxane (HMDS) is the primary residual silicon species. Other residual silicon species, such as neopentoxy trimethyl silane (H-PFI), n-pentoxy trimethyl silane and trimethylsilanol (TMS-OH), are also present at lower levels, either as impurities in the initiator, die-out products of the initiator, or side products of the hydrolysis reaction. These species may contribute as much as 5000 ppm of silicon to the resulting cement.

Following the reaction, the MSA is removed from the polymer cement. Removal can be accomplished by extracting the MSA into a pure water phase. After the water wash, the hydrocarbon solvent, amyl alcohol, and the TMS byproducts are evaporated to produce neat polymer. The neat polymer can be re-dissolved in cyclohexane and treated with the acid solution a second time to improve the percentage of hydrolysis and again then the polymer recovered.

The evaporated solvent containing amyl alcohol, water, and the TMS byproducts must be purified before re-used in the polymerization process. Purification of the solvent may occur by flowing the solvent through an adsorption bed containing a selective adsorbent selected from the group consisting of alumina, silica-alumina, strong acid ion exchange resins, zeolite Y, and combinations thereof, to remove the silicon species from the solvent. The preferred selective adsorbent is the hydrogen form of ultrastable zeolite Y (H-USY). Adsorption tests at 1000 ppm of HMDS indicate that silica gel, potassium on alumina, carbon, sodium on carbon, clay, calcium oxide, ferrierite, and silicalite (ZSM-5) are not suitable for selective adsorption of the silicon species.

Suitable aluminas for use in the present invention include aluminas having a high degree of porosity and surface area. While any alumina may be used in the present invention, the alumina is preferably, an activated alumina with a pore volume from about 0.1 ml/g to about 1.2 ml/g, and more preferably from about 0.4 ml/g to about 0.8 ml/g, and with a surface area from 5 $m^2$/gm to 750 $m^2$/g, preferably from 100 $m^2$/g to 550 $m^2$/g, and more preferably from 250 $m^2$/gm to 400 $m^2$/gm.

Silica-aluminas are also suitable adsorbents due to their high surface area and degree of porosity. A preferred silica-alumina is one having a pore volume from about 0.1 ml/g to about 1.3 ml/g, more preferably from about 0.5 ml/g to about 0.9 ml/g, and having a surface area from about 5 $m^2$/gm to about 650 $m^2$/gm, preferably from about 70 $m^2$/gm to about 450 $m^2$/gm.

Suitable adsorbents of the present invention also include strong acid ion exchange resins. Examples of commercially available ion exchange resins include Dowex MSC-1 (commercially available from Dow Chemical Company, Midland, Mich.), Amberlyst 15 (commercially available from Rohm & Haas, Philadelphia, Pa.), and Amberlyst 35 (commercially available from Rohm & Haas).

Zeolite Y also provides a suitable adsorbent for use in the present invention. Illustrative zeolite Y's include those described in U.S. Pat. No. 3,130,007, which is incorporated herein by reference. Because zeolite Y in its normal, as-synthesized condition, is unstable to acid, it must first be converted to an acid-stable form. Several methods for acid stabilization are known. By one method, the zeolite Y may be extracted with acid to produce a highly siliceous form of the zeolite. Acid-resistant zeolite Y is known as "Ultrastable Y" (USY). USY and methods for stabilization are described in U.S. Pat. Nos. 3,293,192, 3,449,070, and 3,402,996 and the publication, Society of Chemical Engineering (London) Monograph Molecular Sieves, page 186 (1968) by C. V. McDaniel and P. K. Maher, each are incorporated herein by reference. Methods for increasing the silica:alumina ratio of zeolite Y by acid extraction are further described in U.S. Pat. Nos. 4,218,307, 3,591,488 and 3,691,099, each also incorporated herein by reference.

The solvent stream containing the silicon impurities can be contacted with an adsorbent in any number of manners. Adsorption may take place in a continuous or fixed bed arrangement, preferably a fixed bed type and the solvent stream may be contacted with the adsorbents in either an up-flow or down-flow direction, preferably a down-flow direction. In one embodiment of the invention, the solvent containing the silicon-impurities is contacted with a single fixed bed of adsorbent(s). The contact is carried out until the bed becomes saturated with the silicon-impurities. Once saturated, the bed is regenerated and re-used. In another embodiment, a series of beds, preferably from two to four beds, are used thereby allowing for the continuous removal of silicon impurities with at least one bed while the one or more additional beds are being regenerated. In a multi-bed arrangement, adsorption may be in parallel or in series.

The solvent containing the silicon-impurities comes in contact with the adsorbent at a rate of from about 0.5 bed volumes per hour to about 3 bed volumes per hour, preferably from about 1 bed volume per hour to about 2.5 bed volumes per hour, and more preferably about 2 bed volumes per hour. The particular adsorbent used will determine the actual flow rate, temperature, pressure, and loading of the adsorption process. The size of the bed is selected to provide reasonable run times before regeneration and is optimized on the basis of the silicon-impurity content of the solvent. The temperature at which the adsorbent(s) are contacted with the contaminated solvent may vary, but is typically from ambient temperature to about 200° F.

Following treatment of the solvent containing silicon species using the present process, the concentration of silicon species found in the solvent effluent is typically below about 100 ppm (parts per million), more typically from about 10 ppm to about 100 ppm. By removing the silicon species to such a low level, the solvent may be recycled for further use in the manufacturing process.

Since the adsorbent(s) will eventually become saturated or loaded with silicon-impurities, the adsorbent(s) may be stripped and regenerated. In the preferred embodiment of the invention, the adsorbent is stripped of the silicon-impurities by washing it one or more times with water. Preferably, the adsorbent is washed at least twice. Following the recovery of the silicon-impurities from the adsorbent by use of water washing, the adsorbent may be regenerated. This may be accomplished by heating the adsorbent from about 350° F. to about 500° F., preferably from about 400° F. to about 450° F. and purging with an inert gas such as nitrogen for a period of time from about 1 hour to about 3 hours, preferably from about 2 hours to about 2.5 hours, in order to remove all of the water. In an alternative embodiment, the adsorbent is water washed while heating the adsorbent from about 350° F. to about 500° F., preferably from about 400° F. to about 450° F. and purging the heated adsorbent with an inert gas for a period of time from about 1 hour to about 3 hours, preferably from about 2 hours to about 2.5 hours.

The conjugated alkadiene polymers produced as described above have the conventional utilities for terminally functionalized polymers of such as forming adhesives, coatings, and sealants. Additionally, the polymers may be used to modify polyurethanes, polyesters, polyamides, polycarbonates, and epoxy resins.

In a preferred embodiment of the invention, 1,3-butadiene is polymerized with a trimethylsilyloxy lithium compound in cyclohexane. The structure modifier o-dimethoxybenzene is added to produce the desired vinyl content. After polymerization is complete, ethylene oxide is added to introduce the terminal hydroxyl group. The polymer is hydrogenated using a mixture of triethylaluminum and nickel 2-ethylhexanoate, and the cement is washed with dilute phosphoric acid to remove the catalyst. The polymer cement is then concentrated to 40% solids. The trimethylsilyl ether of the resulting polymer is hydrolyzed to "deprotect" the masked hydroxyl group. A solution of methanesulfonic acid (MSA) and water in amyl alcohol is added to the cement to effect the hydrolysis. The major product of hydrolysis is hexamethyldisiloxane (HMDS). Other silyloxy species, such as neopentoxy trimethyl silane, n-pentoxy trimethyl silane and trimethylsilanol, are also present.

The cement is heated to flash off the hydrocarbon solvent. The flashed hydrocarbon solvent containing the silicon species is collected and then contacted with a fixed bed of USY at a rate of from about 0.5 bed volumes per hour to about 3 bed volumes per hour, preferably from about 1 bed volume per hour to about 2.5 bed volumes per hour, and more preferably about 2 bed volumes per hour in a downflow direction.

After the USY becomes saturated or loaded with silicon-impurities, the USY is stripped and regenerated. The USY is stripped of the silicon-impurities by washing it one or more times with water. Preferably, the USY is washed at least twice. Following the recovery of the silicon-impurities from the USY by use of water washing, the adsorbent is regenerated. Regeneration is accomplished by heating the USY bed from about 400° F. to about 450° F. with hot nitrogen gas for a period of time from about 2 hours to about 2.5 hours, in order to remove all of the water. The solvent is now purified and ready for recycle to the polymerization process.

The invention will be further described by the following illustrative embodiments that are provided for illustrative purposes only and are not to be construed as limiting the present invention.

EXAMPLE 1

The full adsorption isotherm of HMDS on H-USY is shown in Table 1 based on overnight contact with cyclohexane having an initial HMDS concentration of 1040 ppm. The saturation capacity of this zeolite is in the order of 6 grams HMDS per 100 grams H-USY. The isotherms are shown for A) the powder form of H-USY, B) the extrudate form of H-USY (CBV 500×16), and C) the crushed extrudate form. The powder form has about 20% higher saturation capacity than the extrudate, and crushing the extrudate did not significantly alter the saturation capacity. The reduced saturation capacity for the extrudate form is likely due to the presence of a binder material.

TABLE 1

| HMDS Loading, | HMDS in Cyclohexane, ppm | | |
|---|---|---|---|
| g/100 g adsorbent | A | B | C |
| 2.6 | 5 | 20 | — |
| 4.5 | — | 130 | — |
| 5.0 | 46 | — | — |
| 5.8 | — | 897 | — |
| 6.0 | — | 430–730 | 434 |
| 6.8 | 361 | — | — |
| 7.5 | 665 | — | — |

EXAMPLE 2

The removal efficiency of HMDS using H-USY based on the data in Table 1 is shown in Table 2. The powder form and the extrudate form have essentially the same removal efficiency.

TABLE 2

| Solvent Loading, | HMDS Removal, % | |
|---|---|---|
| g cyclohexane/g adsorbent | A | B |
| 25 | >98 | >98 |
| 50 | 96 | 88 |
| 100 | 65 | 58 |
| 200 | 36 | 29 |

TABLE 2-continued

| Solvent Loading, g cyclohexane/g adsorbent | HMDS Removal, % | |
|---|---|---|
| | A | B |
| 400 | — | 14 |

EXAMPLE 3

Breakthrough data for the crushed H-USY extrudate was obtained by packing a 40 cc bed and flowing cyclohexane containing 1041 ppm of HMDS through the bed at a flow rate of 80 cc/hr at 23 degrees C. Breakthrough occurred at about 27 bed volumes (13.5 hours) and the concentration of HMDS in the effluent rose to 17 ppm after 34 bed volumes (17 hours). Regeneration of the absorbent occurred after 17 hours by draining the bed and flowing helium through the bed at 100 cc/min for 1 hour at 200 degrees C. The flow of solvent was then resumed and breakthrough of the regenerated adsorbent occurred at 20 bed volumes (10 hours). Subsequent tests with nitrogen and higher regeneration temperature did not improve the breakthrough of the regenerated adsorbent. However, subsequent tests using a water wash (2 bed volumes) prior to regeneration with nitrogen at 50 cc/min for 2 hours at 200 degrees C. did appear to improve HMDS removal from the bed.

While foregoing is directed to the preferred embodiment of the present invention, other and further embodiments of the invention may be devised without departing from the basic scope thereof, and the scope thereof is determined by the claims that follow.

What is claimed:

1. A process for producing telechelic polymers comprising:
    polymerizing a monomer in a hydrocarbon solvent with an initiator comprising silicon;
    separating the telechelic polymer from residual silicon species; and
    removing the residual silicon species from the hydrocarbon solvent with selective adsorbents.

2. The process of claim 1 further comprising hydrogenating the polymer.

3. The process of claim 1, wherein the hydrocarbon solvent comprises liquid alkanes, cycloalkanes, or aromatics.

4. The process of claim 1, wherein the selective adsorbents comprise of molecular sieves, alumina, silica-alumina, ion exchange resins, zeolite Y, or combinations thereof.

5. The process of claim 1, wherein the monomer is butadiene.

6. A process for producing telechelic polymers, comprising:
    anionically polymerizing a diene monomer with an initiator comprising silicon in a hydrocarbon solvent;
    introducing a terminal hydroxyl group;
    hydrolyzing the polymer; and
    removing residual silicon species from the hydrocarbon solvent with an ultrastable zeolite-Y adsorbent.

7. The process of claim 6, further comprising recycling the hydrocarbon solvent.

8. The process of claim 6, wherein the diene monomer is butadiene.

9. The process of claim 6, wherein the hydrocarbon solvent comprises cyclohexane.

10. The process of claim 6, wherein the residual silicon species comprise hexamethyldisiloxane, neopentoxy trimethyl silane, n-pentoxy trimethyl silane, or trimethylsilanol.

11. The process of claim 6, wherein the residual silicon species comprise hexamethyldisiloxane.

12. A process for removing silicon compounds from a hydrocarbon solvent comprising:
    flowing the hydrocarbon solvent through a selective adsorbent comprising molecular sieves, alumina, silica-alumina, ion exchange resins, zeolite Y, or combinations thereof; and
    regenerating the selective adsorbent.

13. The process of claim 12, wherein the solvent is cyclohexane.

14. The process of claim 12, wherein the selective adsorbent is H-USY zeolite.

15. The process of claim 12, wherein the selective adsorbent is regenerated after flowing 27 bed volumes of the hydrocarbon solvent through the selective adsorbent.

16. The process of claim 12, wherein the selective adsorbent is regenerated by flowing water through the selective adsorbent before flowing nitrogen or an inert gas through the selective adsorbent.

* * * * *